(12) United States Patent
Miedel

(10) Patent No.: US 9,832,974 B1
(45) Date of Patent: Dec. 5, 2017

(54) METHOD OF USING A DOG TOY CONTAINER, AND A DOG TOY CONTAINER

(71) Applicant: Jeffrey Miedel, Latrobe, PA (US)

(72) Inventor: Jeffrey Miedel, Latrobe, PA (US)

( * ) Notice: Subject to any disclaimer, the term of this patent is extended or adjusted under 35 U.S.C. 154(b) by 0 days.

(21) Appl. No.: 15/597,773

(22) Filed: May 17, 2017

Related U.S. Application Data

(60) Provisional application No. 62/341,756, filed on May 26, 2016.

(51) Int. Cl.
| | | |
|---|---|---|
| *A01K 15/02* | (2006.01) | |
| *E05F 15/614* | (2015.01) | |
| *E05F 1/00* | (2006.01) | |
| *A01K 5/02* | (2006.01) | |
| *E05F 15/73* | (2015.01) | |
| *B65D 43/16* | (2006.01) | |
| *B65D 43/26* | (2006.01) | |
| *B65D 25/54* | (2006.01) | |
| *B65D 51/24* | (2006.01) | |

(52) U.S. Cl.
CPC .............. *A01K 15/021* (2013.01); *A01K 5/02* (2013.01); *A01K 15/025* (2013.01); *B65D 25/54* (2013.01); *B65D 43/16* (2013.01); *B65D 43/262* (2013.01); *B65D 51/245* (2013.01); *E05F 1/006* (2013.01); *E05F 15/614* (2015.01); *E05F 15/73* (2015.01); *E05Y 2900/602* (2013.01)

(58) Field of Classification Search
CPC ...... A01K 15/021; A01K 5/02; A01K 15/025; B65D 43/16; B65D 43/26; B65D 43/262
See application file for complete search history.

(56) References Cited

U.S. PATENT DOCUMENTS

| 1,040,565 | A | | 10/1912 | Meyrowitz | |
|---|---|---|---|---|---|
| 1,639,992 | A | | 8/1927 | Geibel | |
| 2,475,125 | A | | 7/1949 | Brownell | |
| 2,644,737 | A | | 7/1953 | Davis | |
| 3,121,419 | A | * | 2/1964 | Gillespie | ................ A01K 5/025 |
| | | | | | 119/61.54 |
| 3,301,219 | A | | 1/1967 | Hellekson | |
| 4,119,240 | A | | 10/1978 | Dumas et al. | |
| 4,164,178 | A | * | 8/1979 | Baumann | .............. B65F 1/1405 |
| | | | | | 100/205 |

(Continued)

OTHER PUBLICATIONS

"How to Teach a Dog to Put Away his Toys Dog Tricks" part 1, May 28, 2013, https://www.youtube.com/watch?v=aTDxPMWAvwg (Year: 2013).*

(Continued)

*Primary Examiner* — Lisa L Tsang
*Assistant Examiner* — Magdalena Topolski
(74) *Attorney, Agent, or Firm* — Nils H. Ljungman & Associates

(57) ABSTRACT

A dog toy container can be used to store dog toys or consumable objects, such as chew toys, ropes, balls, stuffed animals, edible chews, bones, and other similar objects used to entertain or reward or please dogs. The dog toy container having a pedal arrangement and a lid in connection with a motorized movement arrangement, such that when a dog depresses the pedal arrangement with its paw, the dog will activate the motor to lift or lower the lid and thereby permit the dog access to the storage area.

17 Claims, 9 Drawing Sheets

(56) References Cited

U.S. PATENT DOCUMENTS

| | | | |
|---|---|---|---|
| 4,200,197 A * | 4/1980 | Meyer | A63H 33/00 |
| | | | 220/263 |
| 4,764,835 A | 8/1988 | Bowman | |
| 4,981,275 A | 1/1991 | Sheu | |
| 5,007,569 A | 4/1991 | Zarb | |
| D323,411 S | 1/1992 | Oathout | |
| 6,622,656 B1 | 9/2003 | Splane | |
| D556,471 S | 12/2007 | Smith | |
| 8,146,767 B1 | 4/2012 | Grant | |
| 8,356,723 B2 | 1/2013 | Clement et al. | |
| 8,716,969 B2 | 5/2014 | Yang et al. | |
| 2010/0224627 A1 * | 9/2010 | Yang | B65F 1/06 |
| | | | 220/212 |
| 2011/0186574 A1 * | 8/2011 | Zhong | B65D 43/26 |
| | | | 220/262 |
| 2014/0000530 A1 * | 1/2014 | Salas | A01K 15/025 |
| | | | 119/707 |
| 2014/0246432 A1 * | 9/2014 | Yang | B65D 43/262 |
| | | | 220/262 |
| 2015/0001219 A1 * | 1/2015 | Hess | B65F 1/06 |
| | | | 220/263 |
| 2015/0269798 A1 * | 9/2015 | Small | G07C 9/00111 |
| | | | 119/51.02 |
| 2016/0333515 A1 * | 11/2016 | Eckerman | D06F 95/002 |
| 2017/0166395 A1 * | 6/2017 | Taylor | B65F 1/06 |

OTHER PUBLICATIONS

"How to Teach a Dog to Put Away his Toys Dog Tricks" part 2, May 28, 2013, https://www.youtube.com/watch?v=LjfjzhErlF4 (Year: 2013).*

Mary Lougee, "How to Teach a Dog to Open a Door" https://www.cuteness.com/blog/content/how-to-teach-a-dog-to-open-a-door (Year: 2017).*

Pat Miller, "Teach Your Dog to Help With Chores Around the House" https://www.whole-dog-journal.com/issues/16_11/features/teach-dog-chores-around-house_20862-1.html (Year: 2013).*

Susan Paretts, "How to Get a Dog to Put Toys in the Box" Oct. 16, 2013, http://dogcare.dailypuppy.com/dog-put-toys-box-3492.html (Year: 2013).*

Langley Cornwell, "How to Teach Your Dog to Clean Up His Toys". Jan. 29, 2014, https://www.canidae.com/blog/2014/01/how-to-teach-your-dog-to-clean-up-his-toys/ (Year: 2014).*

* cited by examiner

METHOD OF USING A DOG TOY CONTAINER, AND A DOG TOY CONTAINER

CONTINUING APPLICATION DATA

This application claims the benefit of U.S. Provisional Patent Application No. 62/341,756, filed on May 26, 2016.

BACKGROUND

1. Technical Field

This application relates to a method of using a dog toy container for storing dog toys or consumable objects, such as chew toys, ropes, balls, stuffed animals, edible chews, bones, and other similar objects used to entertain or reward or please dogs. It should be understood that although dogs will be primarily discussed in this application, the exemplification or exemplifications disclosed herein can be used to store toys for many types of pets, such as dogs, cats, pigs, or similar domesticated animals.

2. Background Information

Background information is for informational purposes only and does not necessarily admit that subsequently mentioned information and publications are prior art.

For pets, such as dogs, toys are an important part of proper care. Toys help fight boredom in a dog that is left alone for periods of time, and can also provide comfort. Toys can even be used to help prevent a dog from developing certain problem behaviors.

While other type of pets can be selective about toys, dogs are often more than willing to play with virtually any object. Accordingly, it is important to control and monitor a dog's playtime to avoid the dog engaging in an undesired "play" activity, such as with household objects, clothing, or items that present a choking hazard or could be dangerous if ingested. To help reduce or minimize the dog's desire to engage in these undesired activities, it is important to supply toys that are both suitable for the dog's size and activity level, and are safe for the dog to use.

For active play, very hard rubber toys are fun for chewing and for carrying around, and are available in a variety of shapes and sizes. Rope-style toys with knotted ends and tennis balls also make great dog toys. Other toys are useful for distracting or occupying a dog's attention. Such toys can usually be filled with dog treats that the dog can obtain after diligently chewing or manipulating the toy for a substantial time. Finally, some toys are of the comfort variety, especially for dogs that are left alone for a substantial period of time. Comfort toys can be most anything soft, such as stuffed animals, clothing, bed linens, or towels.

However, as many dog owners know, these toys can present different problems or annoyances. First, it is not uncommon for dogs to lose a toy during play, either outside or inside the home. A lost toy can be a nuisance, or could be a significant problem if it is one of the dog's favorite toys. Second, toys can be expensive, so loss or excessive damage to a toy can be costly to an owner. Third, toys can become worn and dirty. A chewed-up old tennis ball or filthy T-shirt may be a dog's favorite item, but such toys can be quite an eyesore in the owner's home. Fourth, sometimes a dog will want to engage in playtime with a noisy or active toy when the owner is uninterested, or at a time of day that is inappropriate, such as late at night. Finally, dogs can become bored with toys over time, so it can be beneficial to control access to the toys, and rotate toys in and out to promote a "new" experience with an old toy.

OBJECT OR OBJECTS

An object of this application is to provide a device that stores and controls access to dog or pet toys in order to address the problems with pet toys described herein.

SUMMARY

The object or objects can be achieved in a toy container or box that is designed to store dog toys therein, and is openable and closable by the dog without the need for human action. The toy container, according to at least one possible exemplification, has a movable lid that is connected to a motorized or mechanically-operated moving arrangement that is designed to at least move the lid in an opening movement. The toy container also includes an opening arrangement that is designed to be engaged by a dog to open the toy container by moving the lid. In operation, a trained dog can open the toy container by engaging the opening arrangement, such as with its paws. The lid will then open, permitting the dog to have access to the interior of the toy container. The dog can then either remove a toy from the toy container for play, or can place a toy into the toy container for storage. After the dog is finished accessing the interior of the toy container, the toy container can either automatically close, or can be closed by the dog engaging a closing arrangement.

Such a toy container can solve the above-mentioned problems with pet toys. If a dog is trained to return toys to the toy container, the loss of toys can be minimized or reduced, and it will be easy to locate a toy quickly. The expense of lost toys will therefore also be reduced or minimized. Instead of filthy or damaged toys being strewn about the owner's home, all of the toys can be stored in a toy container in an organized and aesthetically pleasing manner. The toy container can also be designed, according to at least one possible exemplification, such that the opening arrangement is disengaged to prevent access to the interior of the toy container by the dog. Disengaging the opening arrangement can prevent unauthorized play by the dog, or could be used as part of a punishment/reward procedure to deter or encourage certain behaviors. Finally, the toy container can be used to hold an "active" supply of toys, so the owner can track toy usage, and thereby rotate toys in and out of the active supply to provide the dog with a "new" toy on a regular basis.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EXEMPLIFICATION OR EXEMPLIFICATIONS

Figure 1:
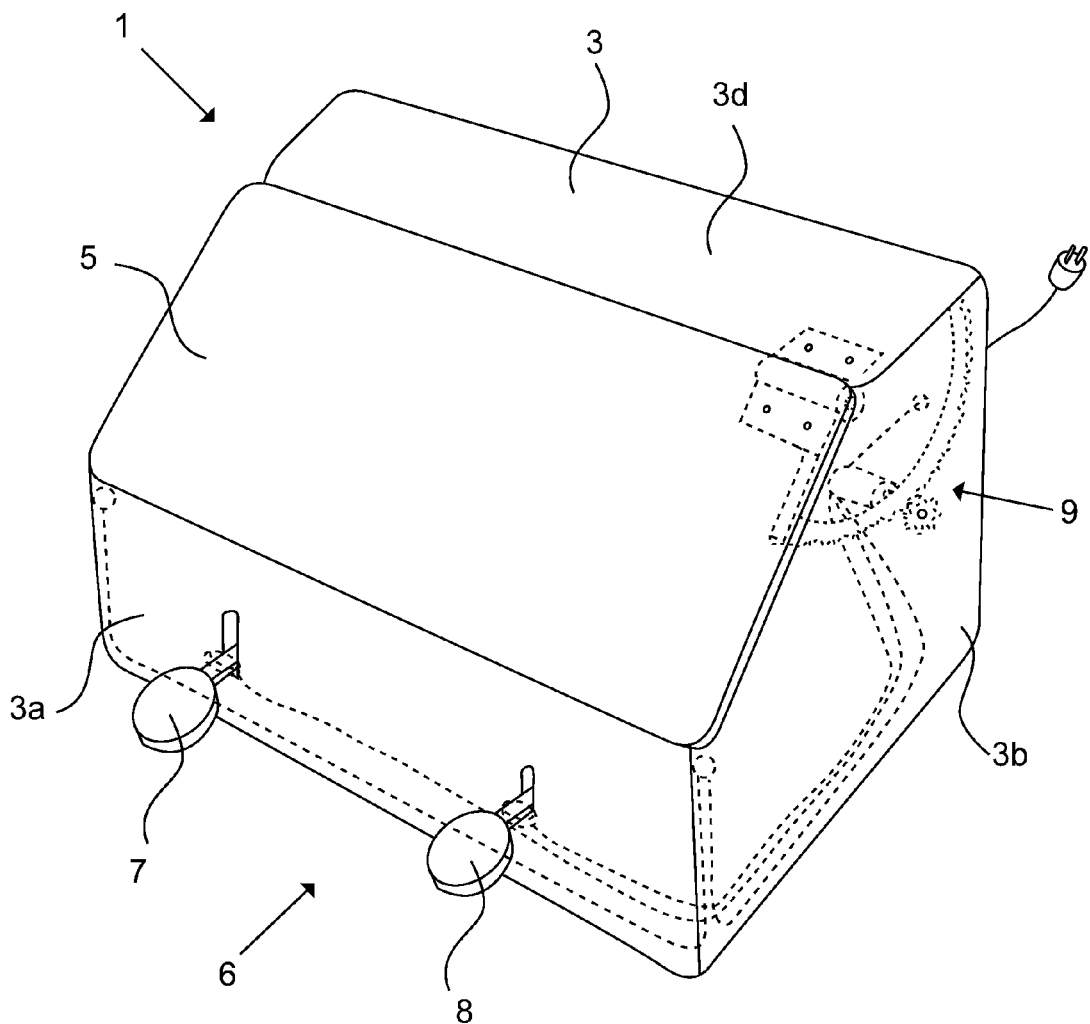
FIG. 1 shows a dog toy container according to at least one possible exemplification.

FIG. 1 shows a dog toy container 1 according to at least one possible exemplification. The container 1 is composed of a frame 3 and a movable lid 5. An activation arrangement 6 comprising a first pedal structure 7 and a second pedal structure 8 is located at the bottom of the frame 3 below the front edge of the lid 5. The activation arrangement 6 is operatively connected to a movement arrangement 9. The activation arrangement 6 is designed to activate the movement arrangement 9 either to open the container 1 by moving the lid 5 upwardly to open the container 1, or to close the container 1 by moving the lid 5 downwardly to close the container 1. In FIG. 1, the lid 5 is closed, and in FIG. 2 the lid 5 is open. It should be noted that the frame 3 and lid 5 may be made of the same or different materials, or combinations of different materials, such as, but not limited to, woods, cardboard, pressed wood, metals, plastics, polymers, acrylics, polycarbonates, and elastomers. For example, the frame 3 and lid 5 may be made entirely of wood or entirely of plastic. Also, for example, the frame 3 may be made of wood, while the lid 5 may be made of plastic, to thereby take advantage of the properties of each material. For example, a lighter-weight plastic could be used to make the lid 5 so that the lid 5 is easier to move, and thus the movement arrangement 9 would not need to be as powerful as one that would be needed to move a heavier lid 5, such as a lid 5 made of solid wood.

Figure 2:
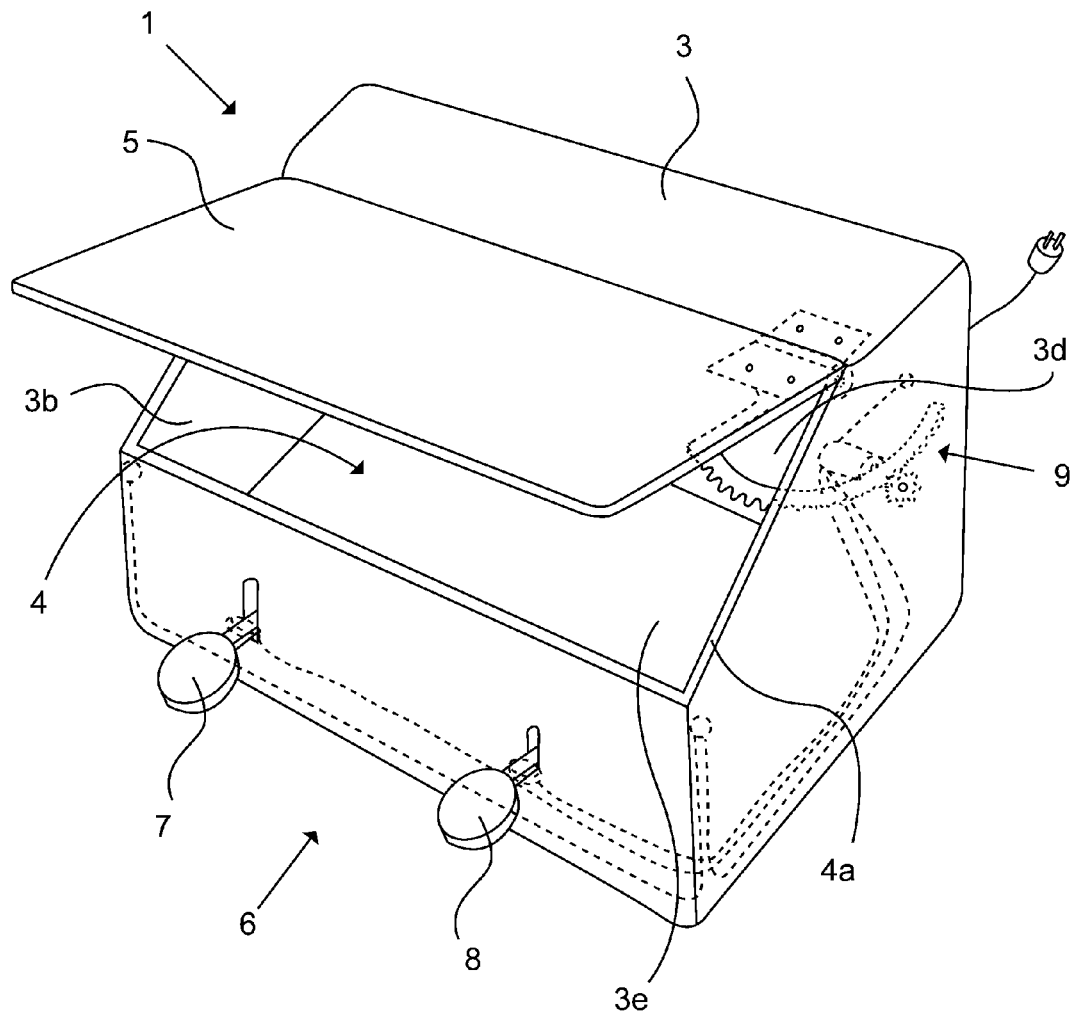
FIG. 2 shows another view of the dog toy container shown in FIG. 1.

As can be seen in FIGS. 1 and 2, the frame 3 is made up of six walls or portions or wall portions 3a-3e. A front portion 3a of the frame 3 is shorter than a back or rear portion 3c of the frame 3. A side portion 3b therefore slopes downwardly from a top portion 3d to the front portion 3a. Such a design provides greater storage capacity for the container 1, but also allows for easier access into the container 1 by a dog, especially if the dog is relatively short or small. In addition, the movement arrangement 9 is located further up and away from where the dog would be accessing the container 1. In one exemplification, a handle (not shown) could be attached to or form part of one of the portions 3a-3d of the frame 3. Such a handle could permit a human user to easily pick up the container 1 as if picking up a briefcase or luggage, in order to transport the container 1 from one location to another.

In addition, the frame 3 has a bottom portion 3e, or underside, opposite the top portion 3d. The bottom portion 3e, in one exemplification, could be equipped with strips or a coating or a sheet of a material having anti-skid or anti-slip properties, such as a rubber, elastomer, or rough material with an increased friction, so that the container 1 does not slide on a floor surface. In another exemplification, one or more projecting portions could be attached to or form part of the bottom portion 3e. The projecting portions could also have anti-skid properties. The projecting portions could be virtually any size or shape, and could serve as feet or legs or supports to raise the container 1 off of the ground or floor surface. In yet another exemplification, the bottom portion 3e could possibly be weighted so as to minimize shifting, sliding, and/or tipping over of the container 1. Weighting of the bottom portion 3e could be accomplished by adding or attaching weights to the bottom portion 3e, incorporating heavy or weighted material into the bottom portion 3e, and/or by making the bottom portion 3e to have a greater thickness than the other portions 3a-3d.

Figure 3:
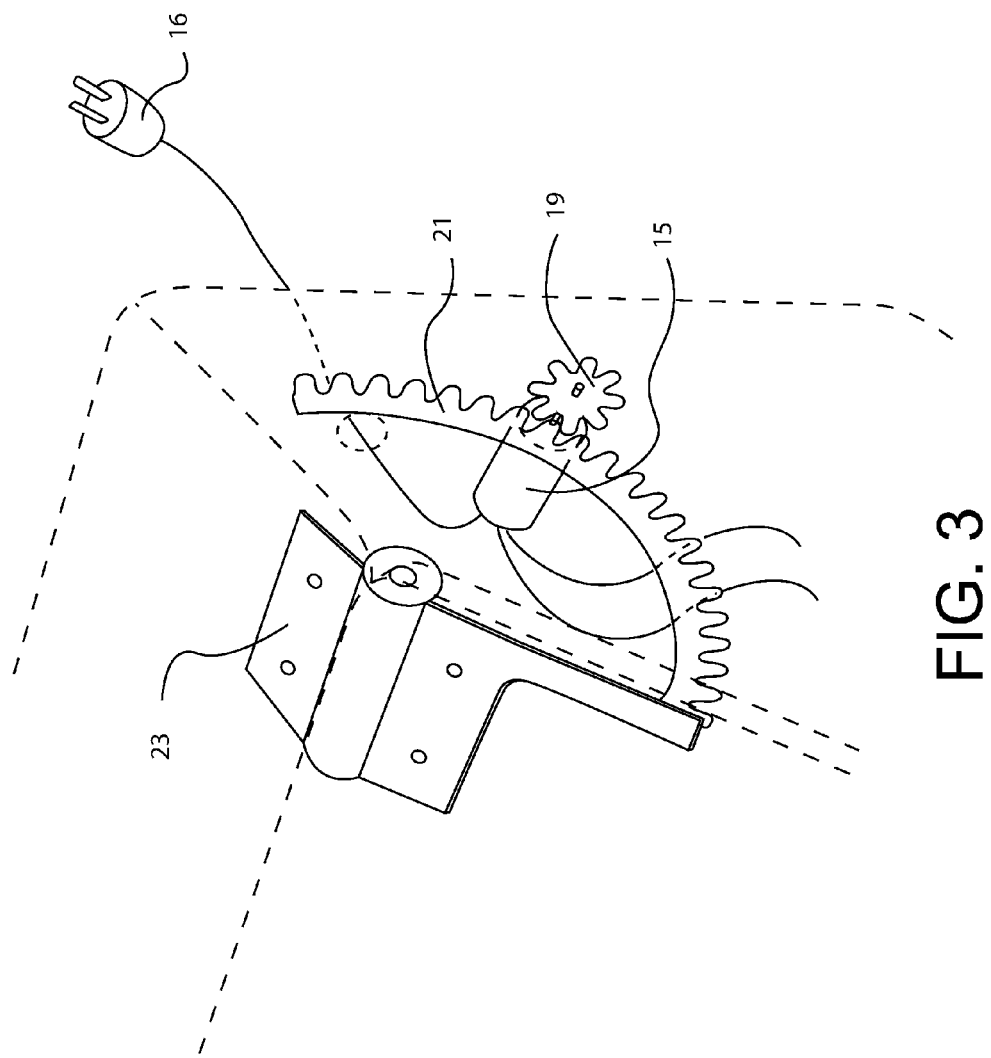
FIG. 3 shows a close-up view of a portion of the dog toy container shown in FIG. 1.
Figure 4:
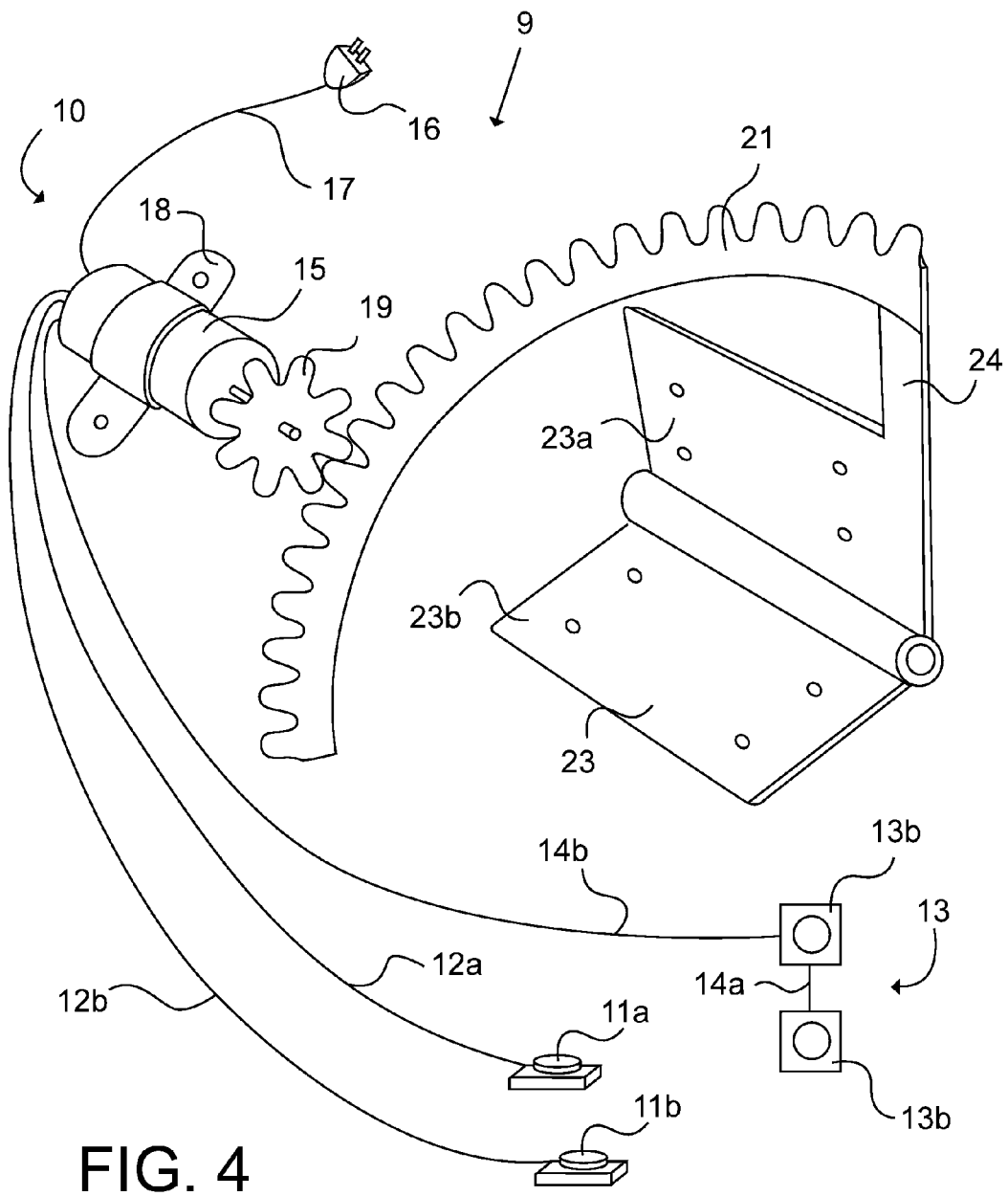
FIG. 4 shows another view of some of the parts of the dog toy container.

FIG. 3 shows a close-up view of a portion of the dog toy container 1. FIG. 4 shows another view of some of the parts of the dog toy container 1. FIG. 4 shows an alternative view in which none of the parts are obscured, so the relationship between the parts can be clearly seen. FIG. 4 is for ease of view of the various parts, and should not be understood as restricting the design or configuration of the various parts to the view shown in FIG. 4. A first contact structure 11a is connected by a first wire 12a to a motor 15, such as a 12-volt direct current (DC) motor, and a second contact structure 11b is connected by a second wire 12b to the motor 15. Also connected to the motor 15 is a safety arrangement 13. The safety arrangement 13 includes a first safety sensor 13a and a second safety sensor 13b, which are connected to one another by a first wire 14a. A second wire 14b connects the safety arrangement 13 to the motor 15. Depending on the material from which the lid 5 is made, such as wood or plastic, the motor 15 can be selected to be a stronger motor for heavier materials, or a less strong motor, such as a micro motor, for lighter materials. A power supply 10, which in FIG. 4 is an electrical cord 17 with a plug 16, is connected to the motor 15 to supply electrical power to the motor 15. Alternatively a battery or solar panel could be used as the power supply 10. A bracket 18 or similar structure can be used to mount the motor 15 to a portion of the frame 3 of the container 1, or to a structure located within the frame 3. A gear 19 is connected to the motor 15. When the motor 15 is activated, the gear 19 is rotated either clockwise or counterclockwise. The gear 19 is meshed with a partial gear 21. The partial gear 21 is connected to a hinge 23. The hinge 23 comprises a first hinge portion 23a, which is connected to the lid 5, and a second hinge portion 23b, which is connected to the frame 3 of the container 1. The partial gear 21, in the exemplification shown, is connected to an extension 24 that extends from first hinge portion 23a. In the exemplification shown in FIGS. 1 and 2, the parts of the moving arrangement 9 are exposed. However, according to another possible exemplification, all or some of the parts of the movement arrangement 9 could be covered or enclosed, such as by a rigid, flexible, or partly rigid/partly flexible housing or sheath or covering. It should be understood that the movement arrangement shown in the figures is one possible movement arrangement that could be used to lift and lower the lid in an opening and closing movement. Other movement arrangements, such as, but not limited to, a movement arrangement that utilizes a piston, could be used.

Figure 5:
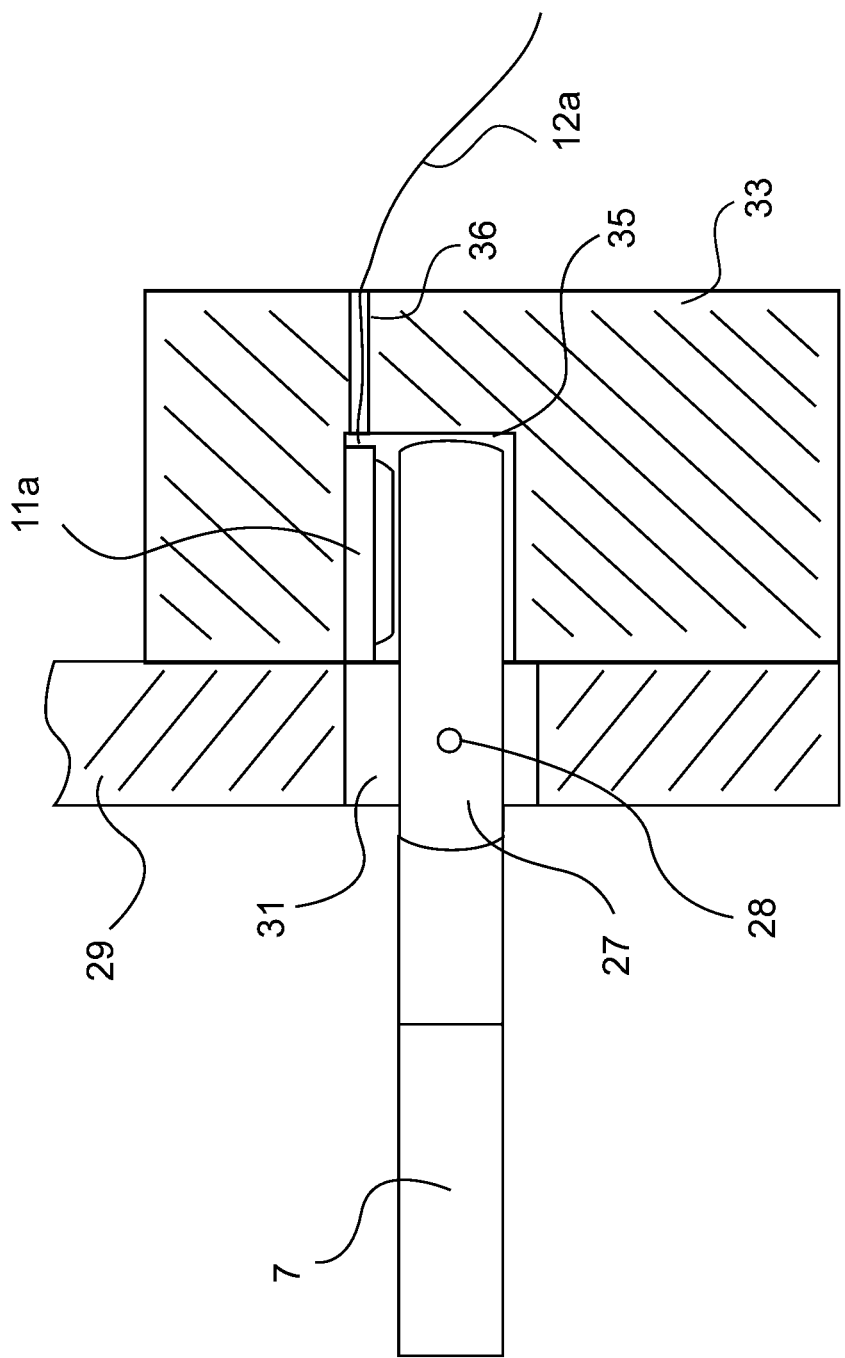
FIG. 5 shows a cross-sectional view of a portion of the dog toy container in FIG. 1.

FIG. 5 shows a cross-sectional view of a portion of the dog toy container 1 in FIG. 1, which portion includes a part of the activation arrangement 6, specifically the first pedal structure 7. It should be understood that the cross-sectional view in FIG. 5 is equally applicable to both the first pedal structure 7 and the second pedal structure 8, although for purposes of convenience, only the first pedal structure 7 is shown. In the exemplification shown, the first pedal structure 7 is connected to an arm 27. A pivot pin 28 passes through the arm 27 and connects the arm 27 to a wall 29 of the frame 3 in a supporting manner. The wall 29 has an opening 31 through which the arm 27 passes. A support piece 33 is connected to the wall 29. The support piece 33 includes a recess 35, which is generally lined up with the opening 31. The arm 27 passes through the opening 31 and into the recess 35. The first contact structure 11a is located inside the recess 35. The first wire 12a runs through a passage 36 in the support piece 33.

The dog toy container 1 can be used to contain dog toys therein, and permits a dog to open and close the container 1. To open the dog toy container 1, the first pedal structure 7 is depressed, causing the arm 28 to pivot and contact the first contact structure 11a. A signal is then sent to the motor 15, which causes the motor 15 to activate and lift the lid 5 in an opening movement. The motor 15 can be designed to run for a certain time or distance, or a mechanical stop can be included to terminate the opening movement. The opening movement can be initiated by the signal and then run automatically until completion. Alternatively, the motor 15 can be controlled by the first pedal structure 7, such that the motor 15 will only operate when the first pedal structure 7 is depressed. If the first pedal structure 7 is released, the motor 15 will disengage and not move the lid 5 any further. In such a design, the first pedal structure 7 would have to be continuously pressed in order to generate a continuous opening movement of the lid 5.

Once the dog toy container 1 is open sufficiently, the interior of the dog toy container 1 is accessible to permit the dog to either remove a toy from the dog toy container 1, or place a toy into the dog toy container 1. Ideally, a dog will be trained to open the dog toy container 1 when the dog wants to retrieve a dog toy or other object, such as a bone or chewable item, from the dog toy container 1, or when the dog wants to return the dog toy or other object to the dog toy container 1 for storage. Once the dog has either retrieved a dog toy from the dog toy container 1 for use, or returned the dog toy to the dog toy container 1 after use, the dog toy container 1 can be closed. Alternatively, a human user could operate the dog toy container 1 as part of the training of the dog and/or normal usage of the dog toy container 1.

To close the dog toy container 1, the second pedal structure 8 is depressed, causing another arm 28 to pivot and contact the second contact structure 11b. A signal is then sent to the motor 15, which causes the motor 15 to activate and lower the lid 5 in a closing movement. The motor 15 can be designed to run for a certain time or distance, or a mechanical stop, such as the frame 3 of the dog toy container 1, can terminate the closing movement. The closing movement can be initiated by the signal and then run automatically until completion. Alternatively, the motor 15 can be controlled by the second pedal structure 8, such that the motor 15 will only operate when the second pedal structure 8 is depressed. If the second pedal structure 8 is released, the motor 15 will disengage and not move the lid 5 any further. In such a design, the second pedal structure 8 would have to be continuously pressed in order to generate a continuous closing movement of the lid 5.

In one exemplification, the first pedal structure 7 and the second pedal structure 8 could be wired such that if both are pressed at the same time, the first pedal structure 7 will override the second pedal structure 8 to result in an opening movement. In another exemplification, the first pedal structure 7 and the second pedal structure 8 could be wired such that if both are pressed at the same time, the motor 15 is not actuated and no movement of the lid 5 occurs. In another exemplification, the first pedal structure 7 and the second pedal structure 8 could be wired such that if an automatic opening or closing movement is being executed and the opposite pedal structure is pressed, a reverse movement will be initiated. In yet another exemplification, the opening movement could be set to run automatically until completion, whereas the closing movement could be set to only occur when the second pedal structure 8 is depressed, and would cease if the pedal structure 8 is not depressed.

There is the possibility that an unsafe situation could occur during the closing movement, such as the head, tail, or limb of a dog or a person, such as a child, being located inside the dog toy container 1 or in the path of the lid 5. For example, the head or neck of a dog or child could possibly become trapped between the lid 5 and the frame 3 of the dog toy container 1 while the lid 5 is being closed. The safety arrangement 13 is designed to protect against such unsafe situations. As shown in FIG. 4, the safety arrangement 13 includes the first safety sensor 13a and the second safety sensor 13b. The safety sensors 13a, 13b could be in the form of photo cells or photo eyes that are operatively connected by an infrared beam. If an object, such as a part of a dog or person, is in the path of the infrared beam, the safety arrangement 13 can either disconnect the power from the power supply 10 to the motor 15 to stop any movement of the lid 5, or can initiate an opening movement of the lid 5. For example, if a dog has depressed or is depressing the second pedal structure 8 to cause a closing movement of the lid 5, but while the dog's head is in the interior of the dog toy container 1, the dog's head should be in the path of the infrared beam. In such a situation, the safety arrangement 13 could initiate either a stoppage or a reversal of the closing movement of the lid 5 to protect the dog. As an alternative or in addition to the safety arrangement 13, the motor 15 could be equipped with a skipping motor and/or a safety override in the case of resistance to movement of the lid 5, to both protect against damage to animals or persons, and against damage to the motor 15 itself. For example, instead of using the safety sensors 13a, 13b, the motor 15 could be designed such that if something obstructs or resists movement of the lid 5, such as the body part of an animal or person, the motor 15 skips or shuts down or executes an automatic reverse movement. Such a design could be used as a safety device to protect against crushing or pinching the body parts of animals or humans between the lid 5 and the frame 3, and could be used to protect against damage to the motor 15 if an object is blocking movement of the lid 5 in either an opening or closing movement. In another exemplification, multiple safety sensors could be used to detect for objects in multiple areas around the upper edge or portion of the frame 3. In another exemplification, the motor 15 could be designed to mechanically disengage from the lid 5 so as to allow manual movement of the lid 5. For example, if there is sufficient resistance or stress on the connection between the motor 15 and the lid 5, the connection could be overcome and broken such that the lid 5 is free to be moved manually. Such a design could be useful in an emergency situation, such as if the other safety mechanisms were to fail and the lid 5 needs to be forced open. A piston could also be included as a safety mechanism to provide a controlled or soft closing of the lid 5 in the event of complete failure of the movement arrangement 9, so that the lid 5 does not slam shut with substantial force sufficient to injure an animal or person. Another possible safety mechanism could be a manual override or disengage built into the frame 3, such as on the side or in the back. In the event of an emergency, a user could engage a button or switch to interrupt all power to the movement arrangement 9, or to force an opening movement of the lid 5, or to mechanically disengage the motor 15 so that the lid 5 can be easily moved manually.

Figure 6:
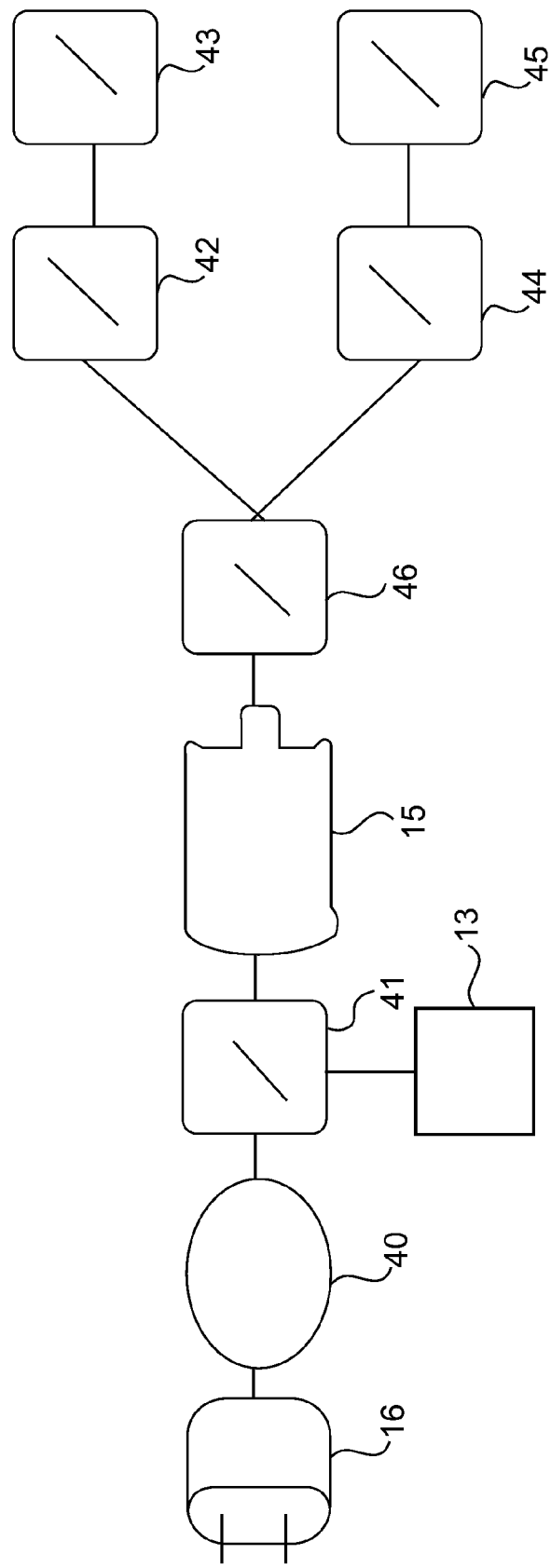
FIG. 6 shows a simplified diagram of components of the dog toy container.
Figure 7:
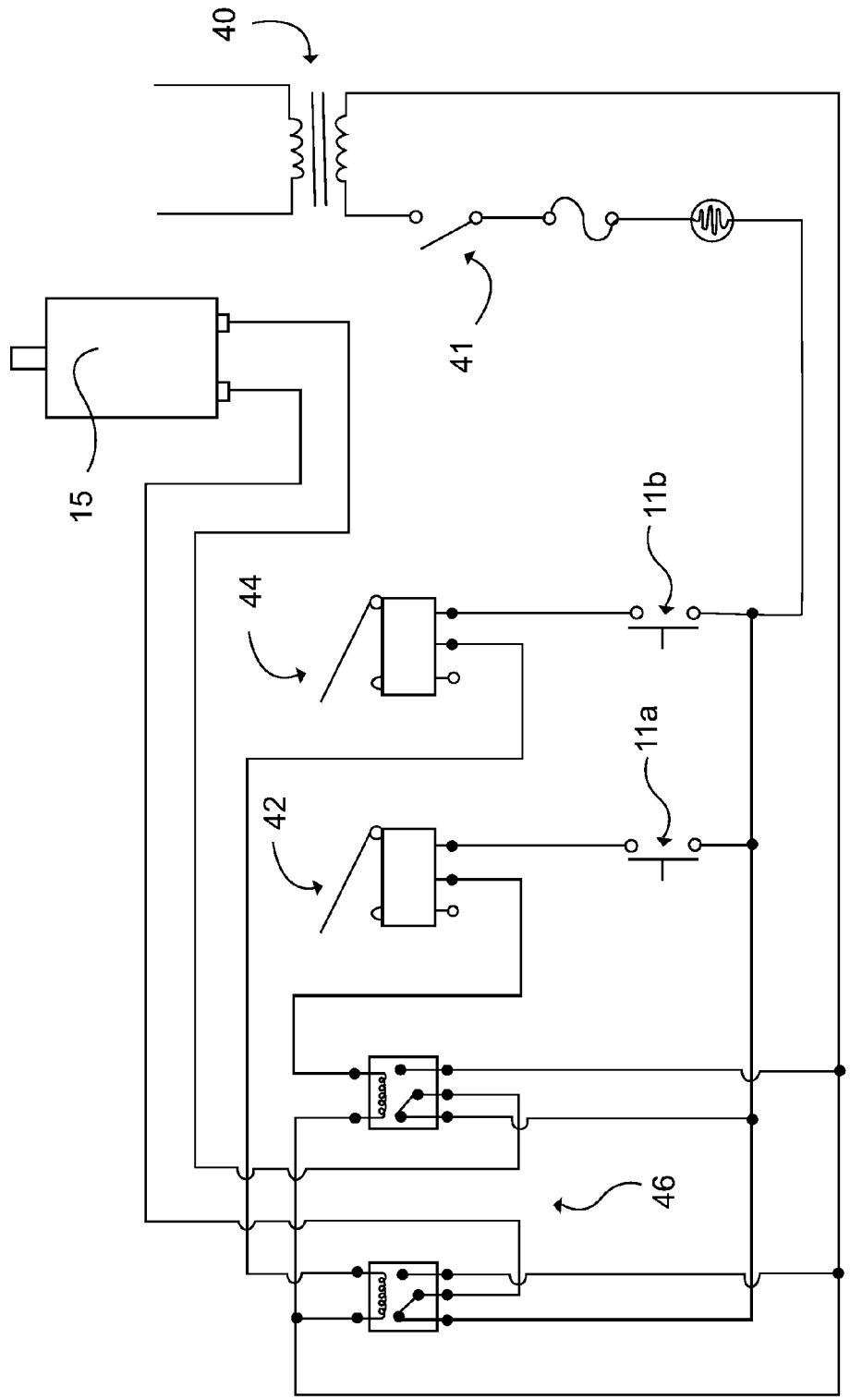
FIG. 7 shows an electrical diagram.

FIG. 6 shows a simplified diagram of components of an exemplification of the dog toy container. The plug 16 is operatively connected to a transformer 40, such as a 110-volt AC to 12-volt DC transformer. A safety disconnect 41 operatively connects the transformer 40 to the motor 15, which is a forward-reverse motor. The safety disconnect 41 can be operatively connected to the safety sensor 13 or other safety mechanism, such that when an unsafe operating condition is detected by the safety sensor 13, the safety disconnect 41 can cut power to the motor 15. A forward/reverse switch 46, or forward/reverse relay, is operatively connected to the motor 15 to determine the operation of the motor 15. An opening switch 42 and a closing switch 44 are operatively connected to the forward/reverse switch 46. When the opening switch 42 is switched, the forward/reverse switch 46 switches to activate the motor 15 to lift or open the lid 5. When the closing switch 44 is switched, the forward/reverse switch 46 switches to activate the motor 15 to lower or close the lid 5. A first limit switch 43 is operatively connected to the opening switch 42, and a second limit switch 45 is operatively connected to the closing switch 44. When the first limit switch 43 is switched, such as by contact with the lid 5, the opening switch 42 is switched such that the forward/reverse switch 46 is switched, such as to a neutral position, so that the motor 15 stops. When the second limit switch 43 is switched, such as by contact with the lid 5, the closing switch 42 is switched such that the forward/reverse switch 46 is switched, such as to a neutral position, so that the motor 15 stops. In operation, for example, the first pedal structure 7 could be pressed, which results in the switching of the opening switch 42 and the forward/reverse switch 46, such that the motor 15 moves forward and lifts or opens the lid 5. The lid 5 can be lifted or moved in an opening movement until the lid 5 contacts or otherwise engages or actuates the first limit switch 42, which could be mounted or placed on the frame 3 of the dog toy container, such as on the top portion 3d. When the lid 5 contacts the first limit switch 43, the opening switch 42 and the forward/reverse switch 46 are switched and the motor 15 stops. At this point, the lid 5 has been lifted or moved in an opening movement to its maximum or fully open position. When it is time to lower or close the lid 5, the second pedal structure 8 could be pressed, which results in the switching of the closing switch 44 and the forward/reverse switch 46, such that the motor 15 moves in reverse and lowers or closes the lid 5. The lid 5 can be lowered or moved in a closing movement until the lid 5 contacts or otherwise engages or actuates the second limit switch 45, which could be mounted or placed on the frame 3 of the dog toy container, such as around the edge or lip in the opening in the frame 3, possibly on the front portion 3a or side portion 3b. When the lid 5 contacts the second limit switch 45, the closing switch 44 and the forward/reverse switch 46 are switched and the motor 15 stops. At this point, the lid 5 has been lowered or moved in an closing movement to its maximum or fully closed position, that is, flush or in contact with the edge or the lip of the opening in the dog toy container 1. In one exemplification, the operation or movement of the lid 5 can be stopped before the lid 5 actuates or engages the limit switches 43, 45, such as by ceasing pressing on either of the pedals 7, 8. FIG. 7 shows a somewhat more detailed electrical diagram, according to one exemplification.

Figure 8:
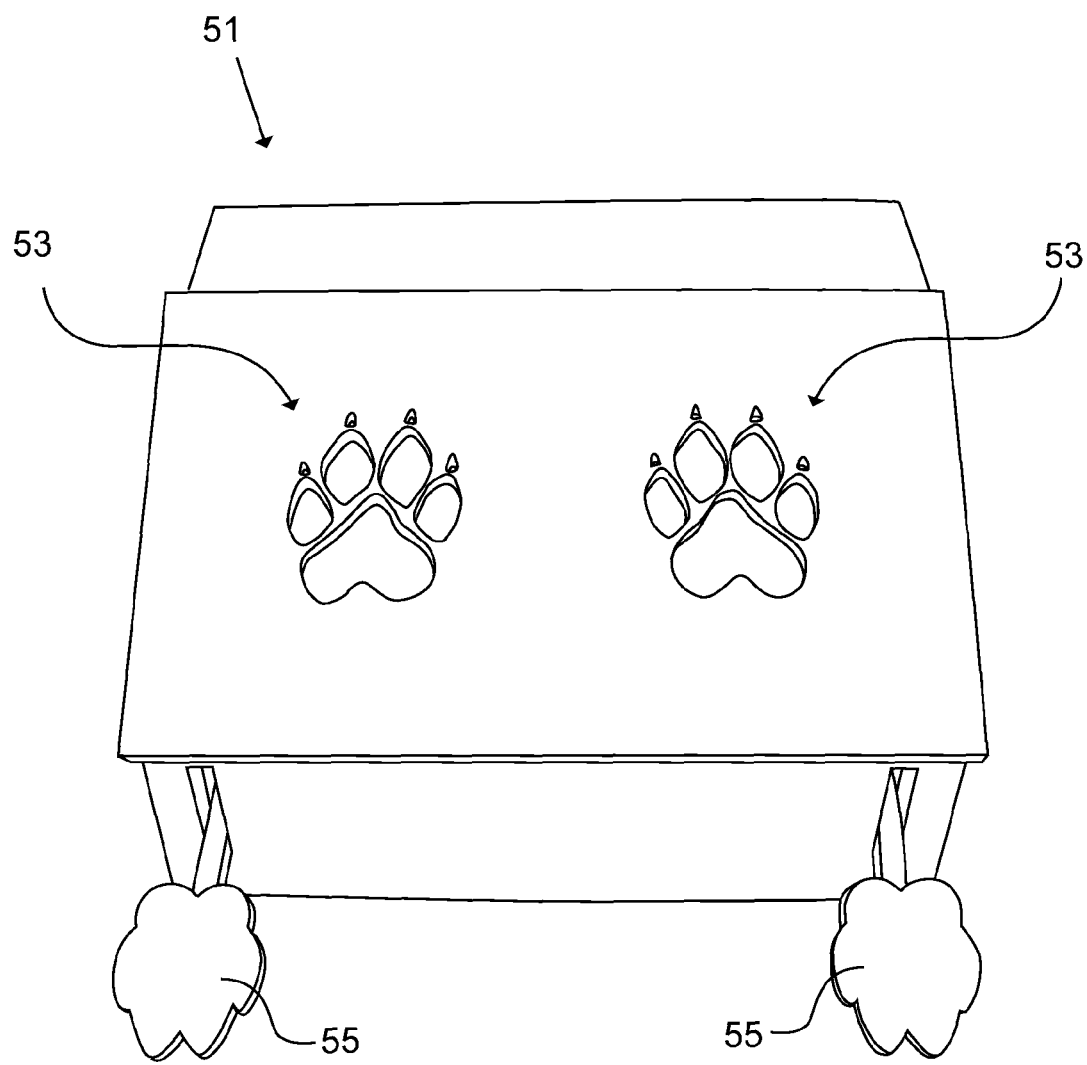
FIG. 8 shows a dog toy container according to at least one possible exemplification, with decorative features.
Figure 9:
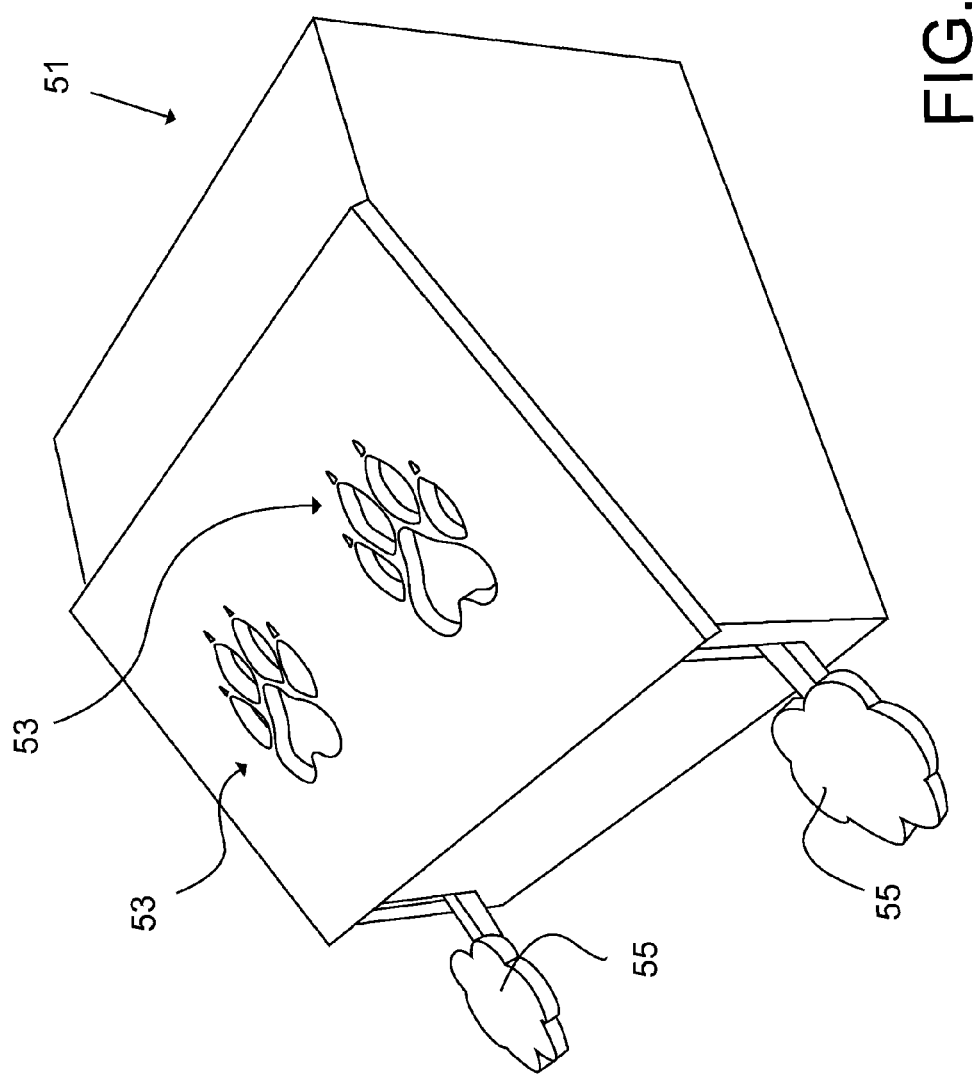
FIG. 9 shows another view of the dog toy container in FIG. 8.

FIG. 8 shows a dog toy container 51 according to at least one possible exemplification, with decorative features. Specifically, such a dog toy container 51 is made from wood and has two openings 53 in the lid thereof, which openings 53 are in the shape of dog paw prints, although in another exemplification, the container 51 is made of plastic with molded openings 53. The pedals 55 that control the opening and closing of the lid also are decoratively designed in a paw or paw print shape. Other decorative features could be added or used based on the type of pet and/or the home decor. FIG. 9 shows another view of the dog toy container in FIG. 8.

One feature or aspect of an exemplification is believed at the time of the filing of this patent application to possibly reside broadly in a method of storing and accessing dog toys in a dog toy container, said dog toy container comprising: a frame comprising wall portions configured and disposed to define a dog toy storage area therein; said frame comprising an opening to permit access into said dog toy storage area by a dog; a lid being configured and disposed to cover said opening; said lid comprising a first end portion being affixed to said frame, and a second end portion being disposed opposite said first end and not being affixed to said frame; a movement arrangement being connected to said lid; said movement arrangement comprising a motor being configured to: lift said second end portion of said lid away from said frame to uncover said opening and permit access to said toy storage area by a dog through said opening, and lower said second end portion of said lid toward said frame to cover said opening with said lid; a pedal arrangement being operatively connected to said motor; said pedal arrangement being configured and disposed to be pressed by a dog to activate said motor to lift said lid and thereby permit the dog to access said dog toy storage area to either retrieve a dog toy from said dog toy storage area, or deposit a dog toy into said dog toy storage area; and said pedal arrangement being configured and disposed to be pressed by a dog to activate said motor to lower said lid and thereby cover said opening with said lid to close the dog toy container; said method comprising the steps of: showing a dog toy to a dog; engaging said pedal arrangement and lifting said lid to open said dog toy container; placing said dog toy into said dog toy container; engaging said pedal arrangement and lowering said lid to close said dog toy container; engaging said pedal arrangement with the paw of said dog to train said dog to lift and lower said lid using said pedal arrangement; instructing said dog to lift said lid and open said dog toy container to permit removal or return of said dog toy from or to said dog toy container; instructing said dog to lower said lid to close said dog toy container after removal or return of said dog toy; permitting said dog to activate said motor by engaging said pedal arrangement with its paw to thereby lift said lid and open said dog toy container to permit said dog to remove said dog toy from said dog toy container; permitting said dog to activate said motor by engaging said pedal arrangement with its paw to thereby lower said lid and close said dog toy container; permitting said dog to activate said motor by engaging said pedal arrangement with its paw to thereby lift said lid and open said dog toy container to permit said dog to return said dog toy back into said dog toy container; and permitting said dog to activate said motor by engaging said pedal arrangement with its paw to thereby lower said lid and close said dog toy container to store said dog toy.

Another feature or aspect of an exemplification is believed at the time of the filing of this patent application to possibly reside broadly in the method, wherein: said pedal arrangement comprises an opening pedal and a closing pedal; said opening pedal is configured to be depressed by a dog to activate said motor to lift said lid; said closing pedal is configured to be depressed by a dog to activate said motor to lower said lid; said step of engaging said pedal arrangement and lifting said lid to open said dog toy container comprises depressing said opening pedal; and said step of engaging said pedal arrangement and lowering said lid to close said dog toy container comprises depressing said closing pedal.

Yet another feature or aspect of an exemplification is believed at the time of the filing of this patent application to possibly reside broadly in the method, wherein: the dog toy container further comprises: a first limit switch being configured and disposed to stop said motor upon said lid being lifted to a fully open position and engaged with said first limit switch; and a second limit switch being configured and disposed to stop said motor upon said lid being lowered to a fully closed position and engaged with said second limit switch; said method further comprises: stopping lifting of said lid by engaging said first limit switch with said lid and thereby stopping said motor; and stopping lowering of said lid by engaging said second limit switch with said lid and thereby stopping said motor.

Still another feature or aspect of an exemplification is believed at the time of the filing of this patent application to possibly reside broadly in the method, wherein one of (A) and (B): (A) said step of lifting said lid comprises automatically lifting said lid to a fully open position by depressing and releasing said opening pedal; and said step of lowering said lid comprises automatically lowering said lid to a fully closed position by depressing and releasing said closing pedal; and (B) said step of lifting said lid comprises lifting said lid by depressing and holding said opening pedal in a depressed position, and stopping lifting of said lid by releasing said opening pedal; and said step of lowering said lid comprises lowering said lid by depressing and holding said closing pedal in a depressed position, and stopping lowering of said lid by releasing said closing pedal.

A further feature or aspect of an exemplification is believed at the time of the filing of this patent application to possibly reside broadly in the method, wherein: the dog toy container further comprises a safety arrangement mounted on said frame and operatively connected to said motor; said safety arrangement is configured and disposed to detect the presence of an object, an animal, a person, or parts thereof, located within said frame and/or in the path of said lid during a lowering or closing of said lid; said safety arrangement is configured to stop said motor or activate said motor to lift said lid upon detection of the presence of an object, an animal, a person, or parts thereof by said safety arrangement, to thereby minimize injury or damage to the object, the animal, the person, or the dog toy container; and said method further comprises: using said safety arrangement to detect the presence of an object, an animal, a person, or parts thereof, located within said frame and/or in the path of said lid during a lowering or closing of said lid; and upon detecting the presence of an object, an animal, a person, or parts thereof, located within said frame and/or in the path of said lid during a lowering or closing of said lid, stopping said motor or activating said motor to lift said lid.

Another feature or aspect of an exemplification is believed at the time of the filing of this patent application to possibly reside broadly in the method, wherein: said opening pedal comprises an opening pedal structure and an opening pedal arm, and said closing pedal comprises a closing pedal structure and a closing pedal arm; said front wall portion comprises a first opening and a second opening therein; said front wall portion comprises a first support piece comprising a first recess aligned with said first opening, and a second support piece comprising a second recess aligned with said second opening; said opening pedal arm is disposed to pass through said first opening into said first recess, and said closing pedal arm is disposed to pass through said second opening into said second recess; the dog toy container comprises an opening contact structure disposed in said first recess, and a closing contact structure disposed in said second recess; said contact structures are operatively connected to said motor; each of said opening pedal arm and said closing pedal arm is pivotably mounted on a corresponding pivot pin connected to said front wall portion within said openings; said step of lifting said lid comprises depressing said opening pedal structure and pivoting said opening pedal arm about its pivot pin, and thereby pivoting an end of said opening pedal arm into said opening contact structure to activate said motor to lift said lid; and said step of lowering said lid comprises depressing said closing pedal structure and pivoting said closing pedal arm about its pivot pin, to thereby pivot an end of said closing pedal arm into said closing contact structure to activate said motor to lower said lid.

Yet another feature or aspect of an exemplification is believed at the time of the filing of this patent application to possibly reside broadly in the method, wherein: the dog toy container comprises an emergency switch operatively connected to said motor to permit a person to interrupt power to said motor and/or mechanically disengage said motor in an emergency situation in which the movement of said lid may cause injury to an animal or a person; and said method further comprises activating said emergency switch and thereby interrupting power to said motor and/or mechanically disengaging said motor in an emergency situation in which the movement of said lid may cause injury to an animal or a person.

Still another feature or aspect of an exemplification is believed at the time of the filing of this patent application to possibly reside broadly in a dog toy container for performing the method according to the present application, said dog toy container comprising: a frame comprising wall portions configured and disposed to define a dog toy storage area therein; said frame comprising an opening to permit access into said dog toy storage area by a dog; a lid being configured and disposed to cover said opening; said lid comprising a first end portion being affixed to said frame, and a second end portion being disposed opposite said first end and not being affixed to said frame; a movement arrangement being connected to said lid; said movement arrangement comprising a motor being configured to: lift said second end portion of said lid away from said frame to uncover said opening and permit access to said toy storage area by a dog through said opening, and lower said second end portion of said lid toward said frame to cover said opening with said lid; a pedal arrangement being operatively connected to said motor; said pedal arrangement being configured and disposed to be pressed by a dog to activate said motor to lift said lid and thereby permit the dog to access said dog toy storage area to either retrieve a dog toy from said dog toy storage area, or deposit a dog toy into said dog toy storage area; and said pedal arrangement being configured and disposed to be pressed by a dog to activate said motor to lower said lid and thereby cover said opening with said lid to close the dog toy container.

A further feature or aspect of an exemplification is believed at the time of the filing of this patent application to possibly reside broadly in the dog toy container, wherein: said pedal arrangement comprises an opening pedal and a closing pedal; said opening pedal is configured to be depressed by a dog to activate said motor to lift said lid; and said closing pedal is configured to be depressed by a dog to activate said motor to lower said lid.

Another feature or aspect of an exemplification is believed at the time of the filing of this patent application to possibly reside broadly in the dog toy container, further comprising: a first limit switch being configured and disposed to stop said motor upon said lid being lifted to a fully open position and engaged with said first limit switch; and a second limit switch being configured and disposed to stop said motor upon said lid being lowered to a fully closed position and engaged with said second limit switch.

Yet another feature or aspect of an exemplification is believed at the time of the filing of this patent application to possibly reside broadly in the dog toy container, wherein one of (A) and (B): (A) said motor is configured to automatically lift said lid to a fully open position upon depressing and releasing said opening pedal; and said motor is configured to automatically lower said lid to a fully closed position upon depressing and releasing said closing pedal; and (B) said motor is configured to lift said lid only while said opening pedal is depressed and held in a depressed position, and configured to stop lifting said lid upon said opening pedal not being depressed; and said motor is configured to lower said lid only while said closing pedal is depressed and held in a depressed position, and configured to stop lowering said lid when said closing pedal is not depressed.

Still another feature or aspect of an exemplification is believed at the time of the filing of this patent application to possibly reside broadly in the dog toy container, wherein: said wall portions of said frame comprise a front wall portion, a back wall portion, a top wall portion, a bottom wall portion, a first side wall portion, and a second side wall portion; said first and second side wall portions connect said front, back, top, and bottom wall portions; each of said front wall portion and said top wall portion comprises a rectangular shape of similar length and width; said back wall portion comprises a rectangular shape of similar width as said top and front wall portions, but of substantially greater length than said top and front wall portions, such that said back wall portion extends vertically higher than said front wall portion; said bottom wall portion comprises a rectangular shape of similar width as said top, front, and back wall portions, but of greater length than said top, front, and back wall portions, such that the dog toy container comprises a greater depth than height for increased stability and storage capacity; each of said first and second side wall portions comprises an irregular pentagonal shape; said top wall portion comprises a front section and a rear section, wherein said rear section is connected to a top section of said back wall portion; said top wall portion extends perpendicularly from said back wall portion; said lid comprises hinges connecting said first end portion of said lid to said front section of said top wall portion; said frame comprises first, second, third, and fourth frame edges disposed about said opening in said frame; said first frame edge is formed by said top wall portion, said second frame edge is formed by said first side wall portion, said third frame edge is formed by said front wall portion, and said fourth frame edge is formed by said second side wall portion; said second and fourth frame edges slope downwardly at an angle from said top wall portion to said front wall portion; and said lid, upon being in said fully closed position, is disposed at a downwardly sloping angle such that a perimeter portion of said lid rests on or against at least said second and fourth frame edges.

A further feature or aspect of an exemplification is believed at the time of the filing of this patent application to possibly reside broadly in the dog toy container, wherein: the dog toy container further comprises a safety arrangement mounted on said frame and operatively connected to said motor; said safety arrangement is configured and disposed to detect the presence of an object, an animal, a person, or parts thereof, located within said frame and/or in the path of said lid during a lowering or closing of said lid; and said safety arrangement is configured to stop said motor or activate said motor to lift said lid upon detection of the presence of an object, an animal, a person, or parts thereof by said safety arrangement, to thereby minimize injury or damage to the object, the animal, the person, or the dog toy container.

One feature or aspect of an exemplification is believed at the time of the filing of this patent application to possibly reside broadly in the dog toy container, wherein: said opening pedal comprises an opening pedal structure and an opening pedal arm, and said closing pedal comprises a closing pedal structure and a closing pedal arm; said front wall portion comprises a first opening and a second opening therein; said front wall portion comprises a first support piece comprising a first recess aligned with said first opening, and a second support piece comprising a second recess aligned with said second opening; said opening pedal arm is disposed to pass through said first opening into said first recess, and said closing pedal arm is disposed to pass through said second opening into said second recess; the dog toy container comprises an opening contact structure disposed in said first recess, and a closing contact structure disposed in said second recess; said contact structures are operatively connected to said motor; each of said opening pedal arm and said closing pedal arm is pivotably mounted on a corresponding pivot pin connected to said front wall portion within said openings; said opening pedal structure is configured and disposed to be depressed to pivot said opening pedal arm about its pivot pin, to thereby pivot an end of said opening pedal arm into said opening contact structure to activate said motor to lift said lid; and said closing pedal structure is configured and disposed to be depressed to pivot said closing pedal arm about its pivot pin, to thereby pivot an end of said closing pedal arm into said closing contact structure to activate said motor to lower said lid.

Another feature or aspect of an exemplification is believed at the time of the filing of this patent application to possibly reside broadly in the dog toy container, wherein: said motor comprises a gear; one of said hinges comprises a partial gear configured and disposed to mesh with said gear of said motor; and said motor is configured and disposed to drive said gear to thereby move said partial gear and said hinge to thereby lift and lower said lid.

Yet another feature or aspect of an exemplification is believed at the time of the filing of this patent application to possibly reside broadly in the dog toy container, wherein each of said opening pedal structure and said closing pedal structure is in the shape of a dog paw or paw print.

Still another feature or aspect of an exemplification is believed at the time of the filing of this patent application to possibly reside broadly in the dog toy container, wherein: said frame comprises wood or plastic or a combination thereof; and said lid comprises wood or plastic or a combination thereof.

A further feature or aspect of an exemplification is believed at the time of the filing of this patent application to possibly reside broadly in the dog toy container, wherein said bottom wall portion comprises at least one of (C), (D), and (E): (C) projecting feet configured to keep said bottom wall portion off of a floor surface; (D) anti-skid material or coating to minimize sliding movement of the dog toy container on a floor surface; and (E) additional weight or weights configured to minimize shifting, sliding, and/or tipping over of the dog toy container.

Another feature or aspect of an exemplification is believed at the time of the filing of this patent application to possibly reside broadly in the dog toy container, wherein one of (F), (G), and (H): (F) said lid and said frame are made of transparent or translucent material to permit viewing of the contents of the dog toy container; (G) said lid is made of transparent or translucent material to permit viewing of the contents of the dog toy container, and said frame is made of opaque material; and (H) said lid and said frame are made of opaque material, and said lid comprises openings therein to permit viewing of the contents of the dog toy container, which openings are formed in a decorative shape or in the shape of a dog paw print.

Yet another feature or aspect of an exemplification is believed at the time of the filing of this patent application to possibly reside broadly in the dog toy container, wherein: said motor comprises a skipping motor configured to allow the motor to skip upon encountering resistance to lifting or lowering movement of said lid; and the dog toy container comprises an emergency switch operatively connected to said motor to permit a person to interrupt power to said motor and/or mechanically disengage said motor in an emergency situation in which the movement of said lid may cause injury to an animal or a person.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

The following U.S. patents are hereby incorporated by reference as if set forth in their entirety herein, except for the exceptions indicated herein: U.S. Pat. Nos. 8,716,969; 8,356,723; 8,146,767; D556,471; U.S. Pat. No. 6,622,656; D323,411; U.S. Pat. Nos. 5,007,569; 4,981,275; 4,764,835; 4,200,197; 4,119,240; 3,301,219; 2,644,737; 2,475,125; 1,639,992; and 1,040,565.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. A method of storing and accessing dog toys in a dog toy container, said dog toy container comprising:
    a frame comprising wall portions configured and disposed to define a dog toy storage area therein;
    said frame comprising an opening to permit access into said dog toy storage area by a dog;
    a lid being configured and disposed to cover said opening;
    said lid comprising a first end portion being affixed to said frame, and a second end portion being disposed opposite said first end portion and not being affixed to said frame;
    a movement arrangement being connected to said lid;
    said movement arrangement comprising a motor being configured to:
        lift said second end portion of said lid away from said frame to uncover said opening and permit access to said toy storage area by said dog through said opening, and
        lower said second end portion of said lid toward said frame to cover said opening with said lid;
    a pedal arrangement being operatively connected to said motor;
    said pedal arrangement being configured and disposed to be pressed by said dog to activate said motor to lift said lid and thereby permit the dog to access said dog toy storage area to either retrieve a dog toy from said dog toy storage area, or deposit said dog toy into said dog toy storage area; and
    said pedal arrangement being configured and disposed to be pressed by said dog to activate said motor to lower said lid and thereby cover said opening with said lid to close the dog toy container;
    said method comprising the steps of: a. showing said dog toy to said dog; b. engaging said pedal arrangement and lifting said lid to open said dog toy container; c. placing said dog toy into said dog toy container; d. engaging said pedal arrangement and lowering said lid to close said dog toy container; e. engaging said pedal arrangement with a paw of said dog to train said dog to lift and lower said lid using said pedal arrangement; f. instructing said dog to lift said lid and open said dog toy container to permit removal or return of said dog toy from or to said dog toy container; g. instructing said dog to lower said lid to close said dog toy container after said removal or return of said dog toy; h. permitting said dog to activate said motor by engaging said pedal arrangement with its paw to thereby lift said lid and open said dog toy container to permit said dog to remove said dog toy from said dog toy container; i. permitting said dog to activate said motor by engaging said pedal arrangement with its paw to thereby lower said lid and close said dog toy container; j. permitting said dog to activate said motor by engaging said pedal arrangement with its paw to thereby lift said lid and open said dog toy container to permit said dog to return said dog toy back into said dog toy container; and k. permitting said dog to activate said motor by engaging said pedal arrangement with its paw to thereby lower said lid and close said dog toy container to store said dog toy.

2. The method according to claim 1, wherein:
    said pedal arrangement comprises an opening pedal and a closing pedal;
    said opening pedal is configured to be depressed by said dog to activate said motor to lift said lid;
    said closing pedal is configured to be depressed by said dog to activate said motor to lower said lid;
    said step of engaging said pedal arrangement and lifting said lid to open said dog toy container comprises depressing said opening pedal; and
    said step of engaging said pedal arrangement and lowering said lid to close said dog toy container comprises depressing said closing pedal.

3. The method according to claim 2, wherein:
the dog toy container further comprises:
- a first limit switch being configured and disposed to stop said motor upon said lid being lifted to a fully open position and engaged with said first limit switch; and
- a second limit switch being configured and disposed to stop said motor upon said lid being lowered to a fully closed position and engaged with said second limit switch;

said method further comprises:
- stopping lifting of said lid by engaging said first limit switch with said lid and thereby stopping said motor; and
- stopping lowering of said lid by engaging said second limit switch with said lid and thereby stopping said motor.

4. The method according to claim 3, further comprising one of (A) and (B):
(A) said step of engaging said pedal arrangement and lifting said lid comprises automatically lifting said lid to said fully open position by depressing and releasing said opening pedal; and
said step of engaging said pedal arrangement and lowering said lid comprises automatically lowering said lid to said fully closed position by depressing and releasing said closing pedal; and
(B) said step of engaging said pedal arrangement and lifting said lid comprises lifting said lid by depressing and holding said opening pedal in a first depressed position, and stopping lifting of said lid by releasing said opening pedal; and
said step of engaging said pedal arrangement and lowering said lid comprises lowering said lid by depressing and holding said closing pedal in a second depressed position, and stopping lowering of said lid by releasing said closing pedal.

5. The method according to claim 4, wherein:
the dog toy container further comprises a safety arrangement mounted on said frame and operatively connected to said motor;
said safety arrangement is configured and disposed to detect the presence of an object, an animal, a person, or parts thereof, located within at least one of said frame and in a path of said lid during the lowering or a closing of said lid;
said safety arrangement is configured to stop said motor or activate said motor to lift said lid upon detection of the presence of the object, the animal, the person, or parts thereof by said safety arrangement, to thereby minimize injury or damage to the object, the animal, the person, or the dog toy container; and
said method further comprises:
- using said safety arrangement to detect the presence of the object, the animal, the person, or parts thereof, located within at least one of said frame and in the path of said lid during the lowering or closing of said lid; and
- upon detecting the presence of the object, the animal, the person, or parts thereof, located within at least one of said frame and in the path of said lid during the lowering or closing of said lid,
stopping said motor or activating said motor to lift said lid.

6. The method according to claim 5, wherein:
said opening pedal comprises an opening pedal structure and an opening pedal arm, and said closing pedal comprises a closing pedal structure and a closing pedal arm;
said wall portions of said frame comprise a front wall portion;
said front wall portion comprises a first opening and a second opening therein;
said front wall portion comprises a first support piece comprising a first recess aligned with said first opening, and a second support piece comprising a second recess aligned with said second opening;
said opening pedal arm is disposed to pass through said first opening into said first recess, and said closing pedal arm is disposed to pass through said second opening into said second recess;
the dog toy container comprises an opening contact structure disposed in said first recess, and a closing contact structure disposed in said second recess;
said contact structures are operatively connected to said motor;
each of said opening pedal arm and said closing pedal arm is pivotably mounted on a corresponding pivot pin connected to said front wall portion within said first and second openings;
said step of engaging said pedal arrangement and lifting said lid comprises depressing said opening pedal structure and pivoting said opening pedal arm about its pivot pin, and thereby pivoting an end of said opening pedal arm into said opening contact structure to activate said motor to lift said lid; and
said step of engaging said pedal arrangement and lowering said lid comprises depressing said closing pedal structure and pivoting said closing pedal arm about its pivot pin, to thereby pivot an end of said closing pedal arm into said closing contact structure to activate said motor to lower said lid.

7. The method according to claim 6, wherein:
the dog toy container comprises an emergency switch operatively connected to said motor to permit the person to perform at least one of interrupting power to said motor and mechanically disengaging said motor in an emergency situation in which a movement of said lid may cause injury to the animal or the person; and
said method further comprises activating said emergency switch and thereby performing at least one of interrupting power to said motor and mechanically disengaging said motor in the emergency situation in which the movement of said lid may cause injury to the animal or the person.

8. The method according to claim 1, wherein:
said step of engaging said pedal arrangement and lifting said lid comprises automatically lifting said lid to a fully open position by depressing and releasing an opening pedal; and
said step of engaging said pedal arrangement and lowering said lid comprises automatically lowering said lid to a fully closed position by depressing and releasing a closing pedal.

9. The method according to claim 1, wherein:
said step of engaging said pedal arrangement and lifting said lid comprises lifting said lid by depressing and holding an opening pedal in a first depressed position, and stopping the lifting of said lid by releasing said opening pedal; and
said step of engaging said pedal arrangement and lowering said lid comprises lowering said lid by depressing and holding a closing pedal in a second depressed position, and stopping the lower of said lid by releasing said closing pedal.

10. The method according to claim 1, wherein:
the dog toy container further comprises a safety arrangement mounted on said frame and operatively connected to said motor;
said safety arrangement is configured and disposed to detect the presence of an object, an animal, a person, or parts thereof, located within at least one of said frame and in a path of said lid during the lowering or a closing of said lid;
said safety arrangement is configured to stop said motor or activate said motor to lift said lid upon detection of the presence of the object, the animal, the person, or parts thereof by said safety arrangement, to thereby minimize injury or damage to the object, the animal, the person, or the dog toy container; and
said method further comprises:
using said safety arrangement to detect the presence of the object, the animal, the person, or parts thereof, located within at least one of said frame and in the path of said lid during the lowering or closing of said lid; and
upon detecting the presence of the object, the animal, the person, or parts thereof, located within at least one of said frame and in the path of said lid during the lowering or closing of said lid, stopping said motor or activating said motor to lift said lid.

11. The method according to claim 1, wherein:
said wall portions of said frame comprise a front wall portion, a back wall portion, a top wall portion, a bottom wall portion, a first side wall portion, and a second side wall portion;
said first and second side wall portions connect said front, back, top, and bottom wall portions;
each of said front wall portion and said top wall portion comprises a rectangular shape of similar length and width;
said back wall portion comprises a rectangular shape of similar width as said top and front wall portions, but of greater length than said top and front wall portions, such that said back wall portion extends vertically higher than said front wall portion;
said bottom wall portion comprises a rectangular shape of similar width as said top, front, and back wall portions, but of greater length than said top, front, and back wall portions, such that the dog toy container comprises a greater depth than height for increased stability and storage capacity;
each of said first and second side wall portions comprises an irregular pentagonal shape;
said top wall portion comprises a front section and a rear section, wherein said rear section is connected to a top section of said back wall portion;
said top wall portion extends perpendicularly from said back wall portion;
said lid comprises hinges connecting said first end portion of said lid to said front section of said top wall portion;
said frame comprises first, second, third, and fourth frame edges disposed about said opening in said frame;
said first frame edge is formed by said top wall portion, said second frame edge is formed by said first side wall portion, said third frame edge is formed by said front wall portion, and said fourth frame edge is formed by said second side wall portion;
said second and fourth frame edges slope downwardly at an angle from said top wall portion to said front wall portion; and
said lid, upon being in a fully closed position, is disposed at a downwardly sloping angle such that a perimeter portion of said lid rests on or against at least said second and fourth frame edges.

12. The method according to claim 11, wherein:
said motor comprises a gear;
one of said hinges comprises a partial gear configured and disposed to mesh with said gear of said motor; and
said motor is configured and disposed to drive said gear to thereby move said partial gear and one of said hinges to thereby lift and lower said lid.

13. The method according to claim 12, wherein an opening pedal structure and a closing pedal structure is in the shape of a dog paw or paw print.

14. The method according to claim 13, wherein:
said frame comprises wood or plastic or a combination thereof; and
said lid comprises wood or plastic or a combination thereof.

15. The method according to claim 14, wherein said bottom wall portion comprises at least one of (A), (B), and (C):
(A) projecting feet configured to keep said bottom wall portion off of a floor surface;
(B) anti-skid material or coating to minimize sliding movement of the dog toy container on the floor surface; and
(C) weight or weights configured to minimize at least one of shifting, sliding, and tipping over of the dog toy container.

16. The method according to claim 15, further comprising one of (D), (E), and (F):
(D) said lid and said frame are made of transparent or translucent material to permit viewing of contents of the dog toy container;
(E) said lid is made of transparent or translucent material to permit viewing of the contents of the dog toy container, and said frame is made of opaque material; and
(F) said lid and said frame are made of opaque material, and said lid comprises openings therein to permit viewing of the contents of the dog toy container, the openings in the lid are formed in a decorative shape or in the shape of a dog paw print.

17. The method according to claim 16, wherein:
said motor comprises a skipping motor configured to allow the motor to skip upon encountering resistance to lifting or lowering movement of said lid; and
the dog toy container comprises an emergency switch operatively connected to said motor to permit a person to perform at least one of interrupting power to said motor and mechanically disengaging said motor said motor in an emergency situation in which the movement of said lid may cause injury to an animal or the person.

* * * * *